(12) United States Patent
Leier et al.

(10) Patent No.: US 9,114,349 B2
(45) Date of Patent: Aug. 25, 2015

(54) CONTROLLED MOISTURE VAPOR TRANSMISSION FILTER ASSEMBLY FOR ELECTRONIC ENCLOSURES

(71) Applicant: DONALDSON COMPANY, INC., Minneapolis, MN (US)

(72) Inventors: Andre D. Leier, Shakopee, MN (US); Daniel L. Tuma, St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 228 days.

(21) Appl. No.: 13/800,158

(22) Filed: Mar. 13, 2013

(65) Prior Publication Data

US 2014/0116254 A1    May 1, 2014

Related U.S. Application Data

(60) Provisional application No. 61/719,138, filed on Oct. 26, 2012.

(51) Int. Cl.
  *B01D 53/02* (2006.01)
  *B01D 53/04* (2006.01)
  *B01D 53/26* (2006.01)

(52) U.S. Cl.
  CPC .......... *B01D 53/0446* (2013.01); *B01D 53/261* (2013.01)

(58) Field of Classification Search
  CPC .................. B01D 53/0446; B01D 53/261
  See application file for complete search history.

(56) References Cited

U.S. PATENT DOCUMENTS

| | | | | |
|---|---|---|---|---|
| 4,862,730 | A | * | 9/1989 | Crosby .............................. 73/38 |
| 5,009,308 | A | | 4/1991 | Cullen et al. |
| 6,143,058 | A | | 11/2000 | Dahlgren et al. |
| 6,238,467 | B1 | | 5/2001 | Azarian et al. |
| 7,153,565 | B1 | * | 12/2006 | Nabata et al. .............. 428/316.6 |
| 8,864,885 | B2 | * | 10/2014 | Yuasa .............................. 96/153 |
| 2003/0056653 | A1 | * | 3/2003 | Ueki et al. ...................... 96/134 |

(Continued)

FOREIGN PATENT DOCUMENTS

| | | |
|---|---|---|
| WO | 01/22421 | 3/2001 |
| WO | 2006/053046 | 5/2006 |

(Continued)

OTHER PUBLICATIONS

International Search Report and Written Opinion for PCT/US2013/066681, mailed Feb. 12, 2014 (14 pages).

(Continued)

*Primary Examiner* — Christopher P Jones
(74) *Attorney, Agent, or Firm* — Pauly, DeVries, Smith & Deffner, LLC (57) ABSTRACT

An adsorbent construction for use in an electronic enclosure is disclosed. In certain embodiments the adsorbent construction comprises an adsorbent material and a polymeric material substantially surrounding the adsorbent material. The polymeric material regulates the flow of water vapor into and out of the adsorbent material. In example implementations one or more openings are present in the polymeric cover, the openings permitting flow of water vapor through the polymeric cover. A filter material can cover the opening in the polymeric cover. The adsorbent material can comprise, for example, activated carbon, silica gel, or a combination thereof.

15 Claims, 8 Drawing Sheets

(56) References Cited

U.S. PATENT DOCUMENTS

2009/0090245 A1 4/2009 Olszewski
2011/0072967 A1* 3/2011 Wood et al. .................. 95/141

FOREIGN PATENT DOCUMENTS

| WO | 2006/084106 | 8/2006 |
|----|-------------|--------|
| WO | 2014066683 | 5/2014 |

OTHER PUBLICATIONS

"Adsorbent Breather Assembly (ABA) Product Guidelines & Specifications," Donaldson Company 2003, 1 page.

"International Preliminary Report on Patentability," for PCT/US2013/066681, mailed May 7, 2015 (10 pages).

* cited by examiner

CONTROLLED MOISTURE VAPOR TRANSMISSION FILTER ASSEMBLY FOR ELECTRONIC ENCLOSURES

This application claims the benefit of U.S. Provisional Application No. 61/719,138, filed Oct. 26, 2012, the contents of which are herein incorporated by reference.

FIELD OF THE INVENTION

The present application is directed to the control of moisture within enclosed volumes. More specifically, the application is directed to the control of moisture within electronic enclosures, such as disk drive enclosures.

BACKGROUND

It is desirable for the interior of many enclosures, such as electronic enclosures containing disk drives, to be maintained at a controlled humidity. Maintaining a controlled low humidity can have the benefit of avoiding corrosion and deterioration of the electronic components. Similarly, it is often desirable to control the humidity within certain ranges, even when the humidity is not necessarily minimized. For example, in the case of disk drive enclosures, the amount of water vapor within the disk drive enclosure will affect air density, thereby impacting the fly height of read-write heads. In these situations it is desirable to keep a controlled, consistent humidity so that the read-write head height can be kept within specific narrow ranges.

It is possible to place an adsorbent material inside an electronic enclosure to absorb ambient moisture. Silica gel is a particularly common adsorbent for this purpose. Even activated carbon has considerable water adsorbing properties. However, the mere addition of an adsorbent into a disk drive enclosure does not necessarily solve all the water control problems, because the manner in which the water is adsorbed and desorbed during the production, storage, and operation of the disk drive. Specifically, the challenge of controlling humidity within disk drives is compounded by the variable conditions in which electronic enclosures are manufactured and used: disk drive enclosures are often assembled in an open environment where the interior of the drive enclosure, including any adsorbent that is present, can readily absorb atmospheric moisture. It can be appreciated that by limiting the water uptake from the manufacturing environment we can preserve the water capacity for when the disk drive enclosure is subsequently completely or nearly completely sealed.

In some situations the moisture that accumulates within the adsorbent will be released into the sealed (or nearly sealed) electronic enclosure when the disk drive is turned on and heated up, causing an increase in absolute humidity that can influence read-write head fly heights. Other examples of the varying conditions experienced by hard disk drives include exposure to a wide range of environments, such as tropical to temperate to even arctic, as well as operating conditions ranging from frequent on-off cycles of notebook computer drives to constant-on use of server drives. All of these environments and operating conditions can cause disruptions in performance if water content within the drive enclosure is not properly managed.

Therefore, a need exists for the ability to control moisture within electronic enclosures, in particular the ability to control moisture within disk drive enclosures.

SUMMARY OF THE INVENTION

Adsorbent constructions for use in electronic enclosures are described herein. The adsorbent constructions include, for example, an adsorbent material and a polymeric material substantially surrounding the adsorbent material. The polymeric material regulates the flow of water vapor into and out of the adsorbent material. This limitation of flow of water vapor is beneficial because it prevents the adsorbent material from adsorbing too much moisture during manufacture of the disk drive, and thereby preserves water adsorbing capacity for removing remaining water vapor after the drive enclosure has been sealed or nearly sealed. In addition, the limitation on moisture flow prevents rapid release of water out of the adsorbent, such as when the drive temperature increases during operation.

The present invention is further directed to an adsorbent construction for use in an electronic enclosure, the adsorbent construction including an adsorbent material along with a polymeric cover substantially surrounding the adsorbent material. The polymeric cover regulates the flow of water vapor into and out of the adsorbent material by an opening in the polymeric cover. The opening permits gradual flow of water vapor through the polymeric cover. In addition, in example embodiments a filter material covers the opening in the polymeric cover, preventing the escape of particulate contaminants from the adsorbent into a disk drive (or other electronic) enclosure. This construction can be placed directly into an electronic enclosure without the need for a further housing or cover.

The present application is further directed to an adsorbent construction for use in an electronic enclosure wherein the adsorbent construction includes a substantially rigid body comprising an internal volume and at least a first opening. An adsorbent material is positioned within the internal volume of the substantially rigid body such that the adsorbent material is substantially surrounded by a polymeric cover. The polymeric cover generally has one or more openings in it to allow for the gradual transfer of water vapor to and from the adsorbent material and will allow for pressure to equalization. In certain implementations a filter material covers an opening of the substantially rigid body, also preventing the escape of particulate contaminants from the adsorbent into a disk drive (or other electronic) enclosure.

The present application is also directed to an adsorbent construction for use in an electronic enclosure wherein the adsorbent construction including a substantially rigid body comprising an internal volume and at least a first opening. A first adsorbent material is positioned within the internal volume of the substantially rigid body. The adsorbent material is substantially surrounded by a polymeric cover. A second adsorbent material is also positioned within the substantially rigid body, the second adsorbent material positioned outside of the polymeric cover substantially surrounding the first adsorbent material. Thus, the second adsorbent material (often containing activated carbon) does not have the same limitations on moisture transfer that limit transfer of water to and from the first adsorbent material. This combination of two adsorbent materials, one of which is surrounded by a polymeric cover and one which is not surrounded by a polymeric cover, can provide advantageous control of water vapor, and can also help with the removal of other contaminants, such as organic materials.

The adsorbent material and polymeric material substantially surrounding the adsorbent material are optionally positioned within a housing, such as a plastic housing. The housing can contain one or more breather openings in communication with the outside of the electronic enclosure. The housing can also include one or more additional filter materials or various moisture barriers and films.

In some implementations described herein the adsorbent material comprises silica gel. Alternative adsorbent materials include, for example, molecular sieves and activated carbon. Suitable adsorbent materials can include combinations of silica gel, molecular sieves, and/or activated carbon. Optionally the adsorbent material is formed into a compression-molded tablet. Other suitable adsorbent materials include adsorbent webs, adsorbent beads, adsorbent granulars, and combinations thereof.

In example embodiments the adsorbent material comprises at least 10 percent silica gel, alternatively at least 40 percent silica gel, and optionally at least 80 percent silica gel by weight. In some implementations the adsorbent comprises less than 20 percent silica gel, alternatively less than 60 percent silica gel, and optionally less than 100 percent silica gel by weight. Suitable adsorbent materials include, for example, adsorbents containing from 0 to 20 percent silica gel by weight, from 40 to 60 percent silica gel by weight, and alternatively from 80 to 100 percent silica gel by weight, and alternatively from 10 to 90 percent silica gel by weight.

In example embodiments the adsorbent material comprises at least 10 percent activated carbon, alternatively at least 20 percent activated carbon, and optionally at least 50 percent activated carbon by weight. In some implementations the adsorbent comprises less than 20 percent activated carbon, alternatively less than 50 percent activated carbon, and optionally less than 100 percent activated carbon by weight. Suitable adsorbent materials include, for example, adsorbents containing from 0 to 20 percent activated carbon, from 20 to 50 percent activated carbon, and alternatively from 50 to 100 percent activated carbon by weight.

In an example embodiment the adsorbent has a water adsorption capacity of less than 60% grams per gram of adsorbent below 60% relative humidity. Optionally the adsorbent has a water adsorption capacity of less than 50% grams per gram of adsorbent below 60% relative humidity; alternatively of less than 40% grams per gram of adsorbent below 60% relative humidity; and or less than 30% grams per gram of adsorbent below 60% relative humidity. In some implementations the adsorbent has a water adsorption capacity of greater than 50% grams per gram of adsorbent below 60% relative humidity, of greater than 30% grams per gram of adsorbent below 60% relative humidity, or of greater than 20% grams per gram of adsorbent below 60% relative humidity. In certain example embodiments, the adsorbent has a water adsorption capacity of from 50% to 60% grams per gram of adsorbent below 60% relative humidity; of from 40% to 50% grams per gram of adsorbent below 60% relative humidity; or from 20% to 30% grams per gram of adsorbent below 60% relative humidity.

The polymeric material substantially surrounding the adsorbent material can comprise, for example, a shrink-wrap film. In some implementations the polymeric material substantially surrounding the adsorbent material comprises a shrink-wrapped film that substantially conforms to the shape of the adsorbent material. The polymeric material may include a polyolefin, such as polyethylene. Suitable polymeric materials include polypropylene, polyethylene terephalate, polyethylene, and combinations thereof. In some implementations the polymeric material includes a metal coating to further limit moisture transport through the film. Suitable polymeric films have a thickness of from 0.1 to 1 mils, from 1 to 3 mils, and from 3 to 5 mils. The films desirably have a moisture vapor transmission rate of less than 25 grams per square meter per 24 hour per mil thickness at 38 degrees C. and 90% relative humidity. In some embodiments a filter material substantially surrounds or covers some or all of the polymeric material.

In various implementations the material substantially surrounding the adsorbent material has at least one opening permitting the flow of water vapor through the opening. Multiple openings can be used in various alternative configurations. The openings provide for the limited, slow transport of water vapor to and from the adsorbent material. In some embodiments the openings are from 0.001 to 2.0 millimeters in width. A filter material can cover the opening or openings in the polymeric material to prevent the release of particulate contaminants.

In some implementations a second adsorbent material is located outside of the polymeric material substantially surrounding a first adsorbent material. In an example embodiment the second adsorbent has a water adsorption capacity of less than 60% grams per gram of adsorbent below 60% relative humidity. Optionally the second adsorbent has a water adsorption capacity of less than 30% grams per gram of adsorbent below 60% relative humidity; alternatively of less than 10% grams per gram of adsorbent below 60% relative humidity. In some implementations the second adsorbent has a water adsorption capacity of greater than 30% grams per gram of adsorbent below 60% relative humidity, of greater than 10% grams per gram of adsorbent below 60% relative humidity, or of greater than 1% grams per gram of adsorbent below 60% relative humidity. In certain example embodiments, the second adsorbent has a water adsorption capacity of from 30% to 60% grams per gram of adsorbent below 60% relative humidity; of from 10% to 30% grams per gram of adsorbent below 60% relative humidity; or from 1% to 10% grams per gram of adsorbent below 60% relative humidity.

This summary is not intended to be limiting of the invention. The invention is further described in the following detailed description and claims.

BRIEF DESCRIPTION OF THE DRAWINGS

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present application is directed to adsorbent constructions for use in electronic enclosures, especially for use in disk drive enclosures. The adsorbent constructions include an adsorbent material, such as silica gel. The flow of water vapor into and out of the adsorbent material is limited by a film that prevents rapid transfer of water vapor. The film can include, for example, a polymeric film that substantially surrounds the adsorbent material. The polymeric film can optionally contain one or more openings to allow water vapor to cross the film, although such flow of water vapor is still significantly slower than if the polymeric film was not present.

In example embodiments the adsorbent material comprises no silica gel, in the alternative at least 20 percent silica gel, alternatively at least 40 percent silica gel, and optionally at least 80 percent silica gel by weight. In some implementations the adsorbent comprises less than 20 percent silica gel, alternatively less than 60 percent silica gel, and optionally less than 100 percent silica gel by weight. Suitable adsorbent materials include, for example, adsorbents containing from 0 to 20 percent silica gel, from 40 to 60 percent silica gel, and alternatively from 80 to 100 percent silica gel by weight.

In example embodiments the adsorbent material comprises no activated carbon, alternatively at least 20 percent activated carbon, alternatively at least 20 percent activated carbon, and optionally at least 50 percent activated carbon by weight. In some implementations the adsorbent comprises less than 20 percent activated carbon, alternatively less than 50 percent activated carbon, and optionally less than 100 percent activated carbon by weight. Suitable adsorbent materials include, for example, adsorbents containing from 0 to 20 percent activated carbon, from 20 to 50 percent activated carbon, and alternatively from 50 to 100 percent activated carbon by weight.

In an example embodiment the adsorbent has a water adsorption capacity of less than 60% grams per gram of adsorbent below 60% relative humidity. Optionally the adsorbent has a water adsorption capacity of less than 50% grams per gram of adsorbent below 60% relative humidity; alternatively of less than 40% grams per gram of adsorbent below 60% relative humidity; and or less than 30% grams per gram of adsorbent below 60% relative humidity. In some implementations the adsorbent has a water adsorption capacity of greater than 50% grams per gram of adsorbent below 60% relative humidity, of greater than 30% grams per gram of adsorbent below 60% relative humidity, or of greater than 20% grams per gram of adsorbent below 60% relative humidity. In certain example embodiments, the adsorbent has a water adsorption capacity of from 50 to 60% grams per gram of adsorbent below 60% relative humidity; of from 40 to 50% grams per gram of adsorbent below 60% relative humidity; or from 20 to 30% grams per gram of adsorbent below 60% relative humidity.

Typically the first adsorbent has at least 20 percent greater total water adsorbing capacity than the second adsorbent material, optionally at least 50 percent greater total water adsorbing capacity than the first adsorbent material, alternatively at least 100 percent greater total water adsorbing capacity than the first adsorbent material, and alternatively at least 200 percent greater total water adsorbing capacity than the first adsorbent material.

Optionally the adsorbent material is formed into a compression molded tablet. Other suitable adsorbent materials include adsorbent webs, adsorbent beads, granular adsorbent, and combinations thereof. The polymeric material substantially surrounding the adsorbent material can comprise, for example, a shrink wrap film. In some implementations the polymeric material substantially surrounding the adsorbent material comprises a shrink wrapped film that substantially conforms to the shape of the adsorbent material.

The polymeric material substantially surrounding the adsorbent material can comprise, for example, a shrink-wrap film. In some implementations the polymeric material substantially surrounding the adsorbent material comprises a shrink-wrapped film that substantially conforms to the shape of the adsorbent material. The polymeric material may include a polyolefin, such as polyethylene. Suitable polymeric materials include polypropylene, polyethylene terephalate, polyethylene, and combinations thereof. In some implementations the polymeric material includes a metal coating to further limit moisture transport through the film. In some embodiments a filter material substantially surrounds or covers some or all of the polymeric material.

In some implementations the material substantially surrounding the adsorbent material has at least one opening permitting the flow of water vapor through the opening. Multiple openings can be used in various alternative configurations. The openings provide for the limited, slow transport of water vapor to and from the adsorbent material. In some embodiments the openings are from 0.001 to 2.0 millimeters in width. A filter material can cover one opening or multiple openings in the polymeric material.

Figure 1:
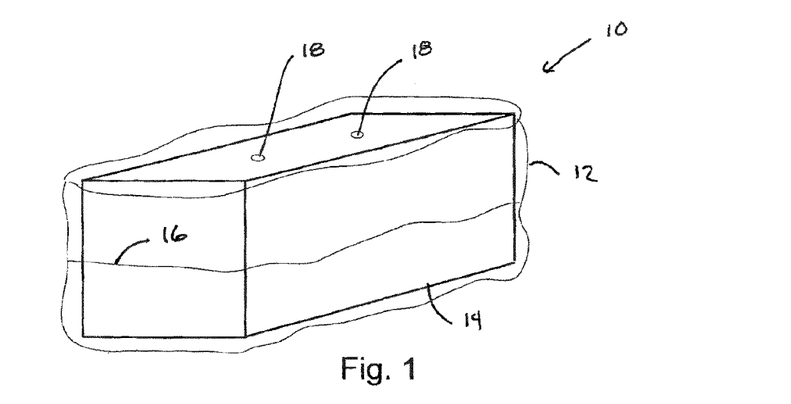
FIG. 1 shows a perspective view of an adsorbent construction made in accordance with an implementation of the invention, the adsorbent construction including a polymeric film covering an adsorbent tablet.

Now, in reference to the drawings, FIG. 1 shows a perspective view of an adsorbent construction 10 made in accordance with an implementation of the invention, the adsorbent construction 10 including a polymeric film 12 covering an adsorbent tablet 14. The polymeric film 12 surrounds the adsorbent tablet 14, thereby restricting the flow of water vapor into and out of the adsorbent tablet 14. The polymeric film 12 surrounding the adsorbent tablet 14 shows a seam 16 along its edges. This seam 16 is formed, for example, by heat laminating two sheets of polymeric material together. The polymeric film 12 depicted in FIG. 1 also shows two openings 18 located at the top surface of the adsorbent construction 10. The two openings 18 allow for the slow transport of water vapor into and out of the adsorbent assembly 10. The two openings 18 also allow for gases to escape during shrinking of the polymeric film 12, in those embodiments where the polymeric film 12 is shrink-wrapped.

Figure 2:
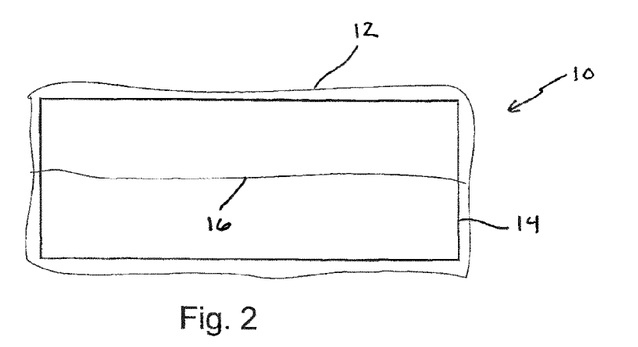
FIG. 2 shows a side elevational view of the adsorbent construction of FIG. 1.

FIG. 2 shows a side elevational view of the adsorbent construction 10 of FIG. 1. It is clear from FIG. 2 that the polymeric film 12 surrounds all sides of the adsorbent tablet 14. The polymeric film 12 also shows the seam 16 where two sheets of polymeric film have been laminated together. It will be understood that in some embodiments this seam 16 will be surrounding the adsorbent tablet 14, while in other implementations the seam will be on just one long side and two short sides of the tablet 14, or optionally will be on just one short side and on two long sides of the tablet 14.

Figure 3:
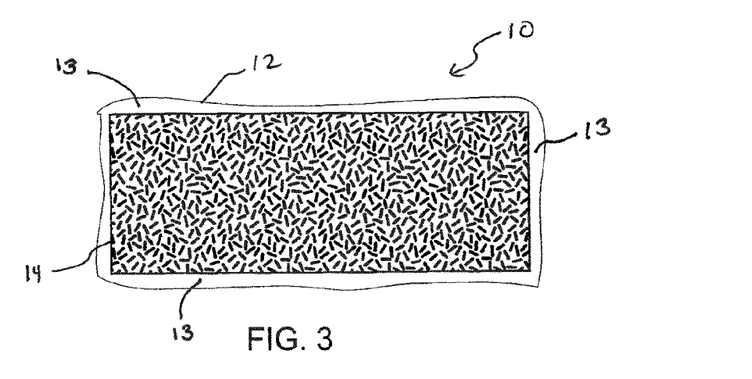
FIG. 3 shows a side cross-sectional view of the adsorbent construction of FIG. 1 and FIG. 2.

FIG. 3 shows a side cross-sectional view of the adsorbent construction 10 of FIG. 1. The adsorbent construction 10 of FIG. 3 shows the polymeric film 12 surrounding an adsorbent tablet 14. In the depicted embodiments of FIGS. 1 to 3, and elsewhere herein, a gap 13 is shown between the polymeric film 14 and the adsorbent (such as adsorbent tablet 14). It will be understood, however, that this gap 13 can be greater or less than that shown in the figures. Thus, for example, when the polymeric material 12 is formed as a shrink wrapped film, the gap 13 can be much less, and even imperceptible when the shrink wrapped film is warmed and contracts around the adsorbent material. In the alternative, in some implementations, a larger gap is formed. However, generally it is desirable that any gap be relatively small so as to keep the overall size of the adsorbent construction compact.

Figure 4:
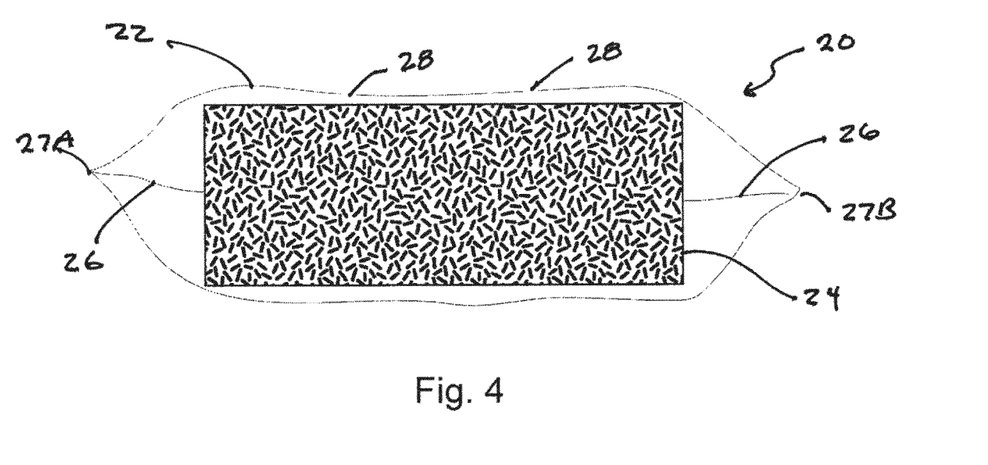
FIG. 4 shows a side cross sectional view of an adsorbent construction made in accordance with an implementation of the invention, the adsorbent construction including a shrink-wrap polymeric film covering an adsorbent tablet, prior to shrinking the film.
Figure 5:
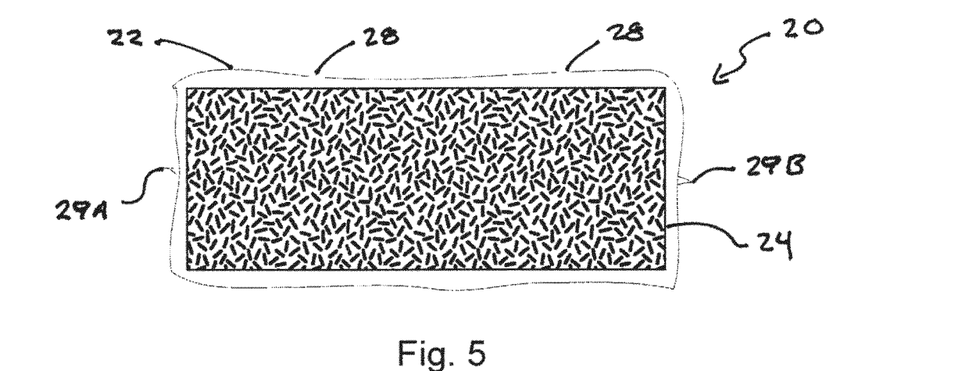
FIG. 5 shows a side cross sectional view of an adsorbent construction made in accordance with an implementation of the invention, the adsorbent construction including a shrink-wrap polymeric film covering an adsorbent tablet, after shrinking the film.

FIGS. 4 and 5 show a side cross sectional view of an adsorbent construction 20 made in accordance with an implementation of the invention, the adsorbent construction 20 including a shrink-wrap polymeric film 22 covering an adsorbent tablet 24, before shrinking the film (FIG. 4) and after shrinking the film (FIG. 5). In FIG. 4 the polymeric film 22 surrounds the adsorbent tablet 24, and includes a seal 26 culminating in sealed ends 27A and 27B. The polymeric film 22 is substantially impermeable to air flow, other than through openings 28 at the top of the adsorbent construction 20. The construction is subsequently exposed to elevated temperature (such as by using a heat lamp or hot air stream), causing the polymeric film 22 to shrink and conform to the general shape of the tablet 24. The sealed ends 27A and 27B shrink down in this example to form small tabs 29A and 29B.

Figure 6:
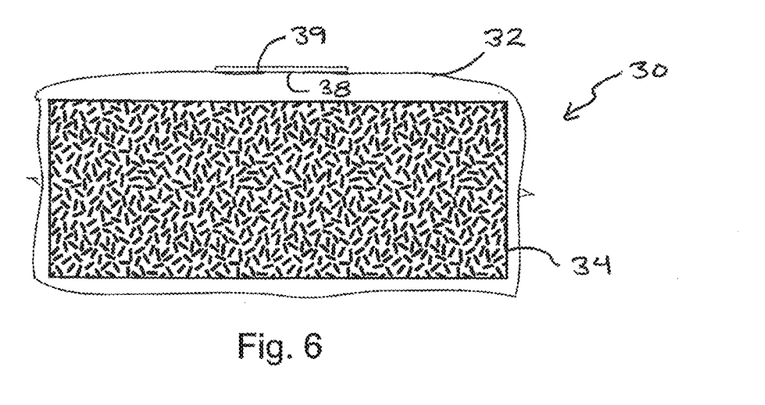
FIG. 6 shows a side cross sectional view of an adsorbent construction made in accordance with an implementation of the invention, the adsorbent construction including a polymeric film covering an adsorbent tablet and a filter material applied to the outside of an opening in the shrink-wrap polymeric film.

FIG. 6 shows a side cross sectional view of an adsorbent construction 30 made in accordance with an implementation of the invention, the adsorbent construction 30 including a polymeric film 32 covering an adsorbent tablet 34. The polymeric film contains an opening 38 and a filter material 39 applied to the outside of the opening 38 over the polymeric film 32. The opening 38 allows for movement of some water vapor across the polymeric film 32, but still significantly regulates the flow rate. In addition, the filter material 39 helps prevent the release of particulate contaminants from the inside of the polymeric film 32. For example, silica gel particles or activated carbon particles, which can be released from the adsorbent tablet 34. The filter material can be selected from various filter materials and includes, for example, expanded polytetrafluoroethylene (PTFE). The filter material also optionally regulates the rate of moisture transport across the polymeric film 32. The opening 38 in the polymeric film 32 is generally larger than an opening that would be used without the filter material. Suitable sized openings 38 include, for example, an area of greater than 0.001 square millimeters, greater than 0.01 square millimeters, greater than 0.05 square millimeters, greater than 0.1 square millimeters, greater than 0.2 square millimeters, greater than 1 square millimeters, greater than 5 square millimeters, or greater than 10 square millimeters.

Figure 7:
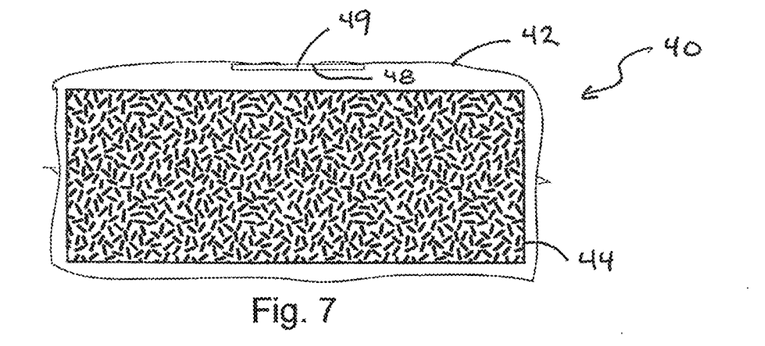
FIG. 7 shows a side cross sectional view of an adsorbent construction made in accordance with an implementation of the invention, the adsorbent construction including a polymeric film covering an adsorbent tablet and a filter material applied to the inside of an opening in the shrink-wrap polymeric film.

FIG. 7 shows an alternative adsorbent construction 40 similar to that of FIG. 6, with the adsorbent construction 40 including a polymeric film 42 covering an adsorbent tablet 44 and a filter material 49 applied to the inside of an opening 48 in the polymeric film 42. An advantage of the design of FIG. 7 is that the filter material 49 is located between the polymeric film 42 and the adsorbent tablet 44. This design avoids having an exposed edge around the filter material 49, potentially allowing for an especially secure connection with the polymeric film 42.

The adsorbent constructions 30, 40 of FIGS. 6 and 7 can optionally be installed directly into an electronic enclosure, without the need for additional housings or covers. The polymeric films surrounding the adsorbent prevent the rapid migration of water into and out of the adsorbent material. In addition, in combination with the filter materials 39, 49, particulate contamination from adsorbent tablets 34, 44 is avoided. Thus, the adsorbent constructions 30, 40 can be readily installed within a disk drive enclosure by dropping them into a recess, securing them with a bracket, adhering them in place with an adhesive, or otherwise retaining them within an electronic enclosure.

Figure 8:
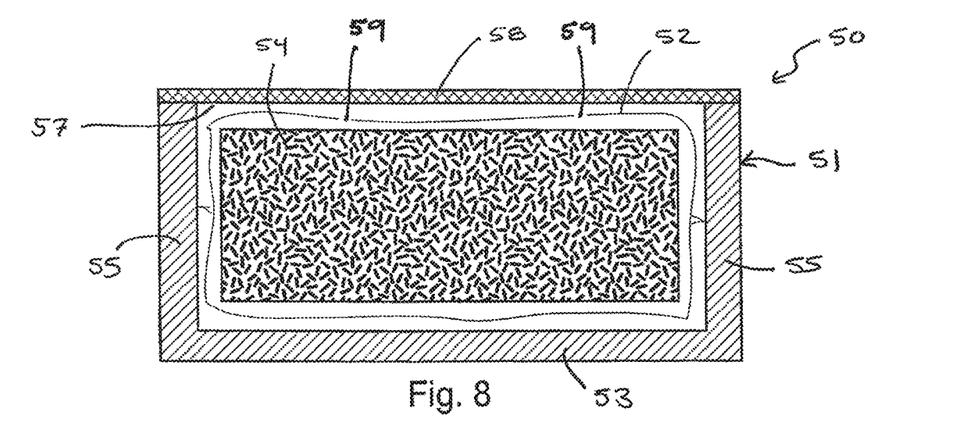
FIG. 8 shows a side cross sectional view of an adsorbent construction made in accordance with an implementation of the invention, the adsorbent construction including a polymeric film covering an adsorbent placed within a housing, and with filter material covering an opening in the housing.

In other implementations it is desirable to place the adsorbent material within a rigid or substantially rigid enclosure, such as shown in FIG. 8. The adsorbent construction 50 of FIG. 8 shows a side cross sectional view of a plastic housing 51 that has a bottom 53 and side walls 55. The adsorbent construction 50 includes a polymeric film 52 covering an adsorbent tablet 54 placed within housing 51, and with filter material 58 covering an opening 57 at the top of the housing. The polymeric film 52 includes openings 59 in the depicted embodiment.

Figure 9A:
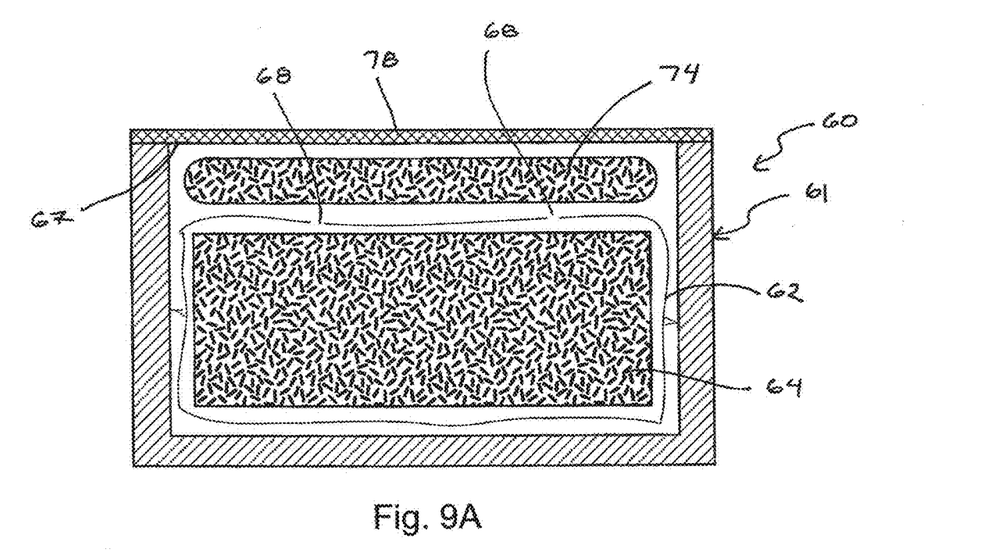
FIG. 9A shows a side cross sectional view of an adsorbent construction made in accordance with an implementation of the invention, the adsorbent construction including a polymeric film covering an adsorbent tablet, and a second adsorbent material located outside of the polymeric film.

FIG. 9A shows a side cross sectional view of an alternative adsorbent construction 60 made in accordance with an implementation of the invention. The adsorbent construction 60 includes a polymeric film 62 covering a first adsorbent 64. A second adsorbent 74 is located outside of the polymeric film 62. Both the first adsorbent 64 and the second adsorbent 74 are located inside a plastic housing 61. Flow of water vapor to and from the first adsorbent 64 is limited by the polymeric film 62, through which one or more openings 68 have been made. The second adsorbent 74 is not surrounded by a polymeric film, and therefore can more freely take up and release water vapor and more importantly freely adsorb organic contaminates and acid gases that are harmful to the drive. Generally the first adsorbent 64 will have a greater capacity to hold water than the second adsorbent 74. Also, the two adsorbents can be made of different materials. For example, the first adsorbent can be primarily or completely silica gel, while the second adsorbent can be primarily or completely activated carbon. This selection of adsorbents, wherein the encapsulated first adsorbent comprises silica gel, and the non-encapsulated adsorbent comprises activated carbon, has the benefit that the silica gel will only slowly take up moisture during production and storage of the disk drive, including during production and storage of the first adsorbent itself. In particular, this first adsorbent, by nature of its encapsulation in the polymeric film 62, will not generally become saturated by water during handling while manufacturing the disk drive and assembling the components. This allows the first adsorbent 64 to have additional water adsorbing capacity upon sealing of the drive enclosure at the end of manufacturing, at which time the remaining water in the enclosure can be removed by the first adsorbent 64. This additional adsorption may be slow, as a result of the fact that moisture must migrate into the adsorbent by way of small openings 68, but this slow adsorption of water is matched with subsequent slow release of water if the first adsorbent subsequently releases water (such as upon heating of the drive).

FIG. 9A also shows how a filter material 78 covers the top of plastic housing 74 at opening 67. The filter material 78 can be, for example, expanded polytetrafluoroethylene film. The filter material 78 helps prevent the release of particulate contaminants from the inside of the housing 61, such as silica gel particles or activated carbon particles, which can be released from the adsorbents 64, 74. The filter material 78 can be selected from various filter materials and includes, for example, expanded polytetrafluoroethylene (PTFE).

Figure 9B:
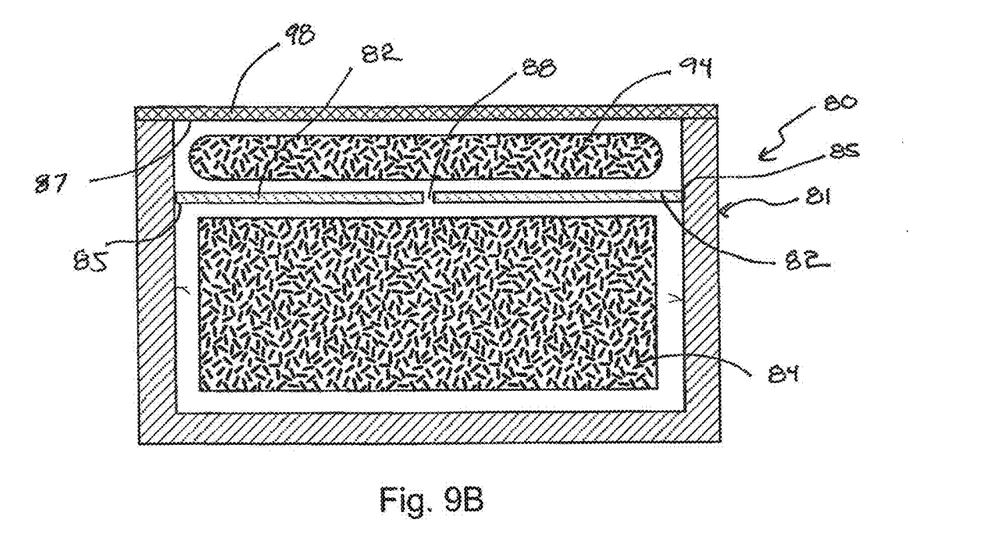
FIG. 9B shows a side cross sectional view of an adsorbent construction made in accordance with an implementation of the invention, the adsorbent construction including an adsorbent tablet positioned within a recess, a substantially water impermeable film covering the adsorbent tablet (but with an opening in the film), and a second adsorbent material located within the housing.

FIG. 9B shows a side cross sectional view of an alternative adsorbent construction 80 made in accordance with an implementation of the invention, the adsorbent construction 80 including a first adsorbent 84 positioned within a recess within a plastic housing 81, a substantially water impermeable film 82 on top of the adsorbent 84 (but with an opening 88 in the film 82), and a second adsorbent material 94 located within the housing 81.

Both the first adsorbent 84 and the second adsorbent 94 are located inside plastic housing 81. Flow of water vapor to and from the first adsorbent 84 is limited by the film 82, through which an opening 88 has been made. The film 82 does not surround the first adsorbent 84, but still regulates the movement of moisture into and out of the adsorbent because all other sides of the first adsorbent 84 are surrounded by the plastic housing 81. Generally the film 82 is attached along its edges 85 to the plastic housing 81. However, in some implementations the polymeric film is merely set in place on top of the first adsorbent. Also, it will be noted, a metal foil or film, or other non-polymeric film, can be used as the water impermeable film 82.

The second adsorbent 94 is not surrounded by a polymeric film and lies above the impermeable film 82, and therefore can more freely take up and release water vapor and more importantly freely adsorb organic contaminates and acid gases that are harmful to the drive. Generally the first adsorbent 84 will have a greater capacity to hold water than the second adsorbent 94. Also, the two adsorbents can be made of different materials. For example, the first adsorbent can be primarily or completely silica gel, while the second adsorbent can be primarily or completely activated carbon. This selection of adsorbents, wherein the encapsulated first adsorbent comprises silica gel, and the non-encapsulated adsorbent comprises activated carbon, has the benefit that the silica gel will only slowly take up moisture during production and storage of the disk drive, including during production and storage of the first adsorbent itself. In particular, this first adsorbent, by nature of its position beneath impermeable film 82, will not generally become saturated by water during handling while manufacturing the disk drive and assembling the components. This allows the first adsorbent 84 to have additional water adsorbing capacity upon sealing of the drive enclosure at the end of manufacturing, at which time the remaining water in the enclosure can be removed by the first adsorbent 84.

FIG. 9B also shows a filter material 98 covering the top of plastic housing 81 at opening 87. The filter material 98 can be, for example, expanded polytetrafluoroethylene film. The filter material 98 helps prevent the release of particulate contaminants from the inside of the housing 81. For example, silica gel particles or activated carbon particles, which can be released from the adsorbents 84, 94. The filter material 98 can be selected from various filter materials and includes, for example, expanded polytetrafluoroethylene (PTFE).

Figure 10A:
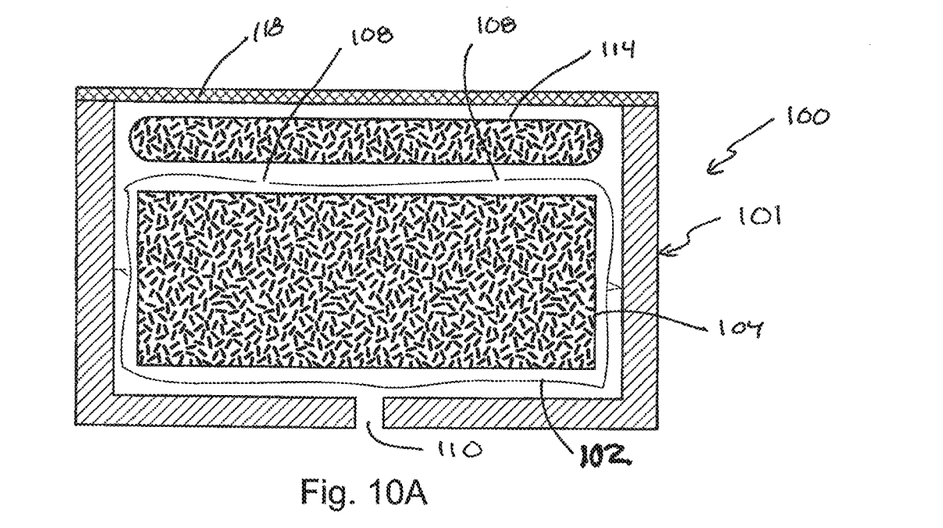
FIG. 10A shows a side cross sectional view of an adsorbent construction made in accordance with an implementation of the invention, the adsorbent construction including a polymeric film covering an adsorbent tablet, and a second adsorbent material located outside of the polymeric film. A breather opening in the bottom of the housing allows air exchange outside of an electronic enclosure.
Figure 10B:
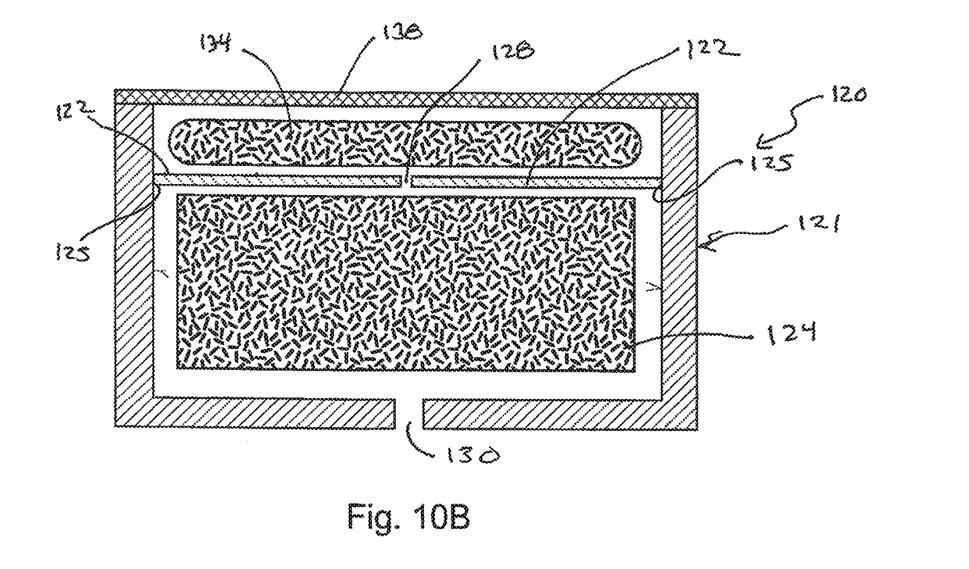
FIG. 10B shows a side cross sectional view of an adsorbent construction made in accordance with an implementation of the invention, the adsorbent construction including an adsorbent tablet positioned within a recess, a substantially water impermeable film covering the adsorbent tablet (but with an opening in the film), and a second adsorbent material located within the housing. A breather opening in the housing allows air exchange outside of an electronic enclosure.

FIGS. 10A and 10B show side cross sectional views of two additional adsorbent constructions 100, 120, similar to those shown in FIGS. 9A and 9B, but with breather openings 110, 130 positioned on one surface of the plastic housings 101, 121. The breather openings typically cover a corresponding opening in the electronic enclosure (not shown). The breather opening in the housing allows air exchange outside of an electronic enclosure.

The adsorbent construction 100 of FIG. 10A includes a polymeric film 102 covering a first adsorbent 104, and a second adsorbent 114 located outside of the polymeric film 102. Both the first adsorbent 104 and the second adsorbent 114 are located inside plastic housing 101. Flow of water vapor to and from the first adsorbent 104 is limited by the polymeric film 102, through which one or more openings 108 have been made. The second adsorbent 104 is not surrounded by a polymeric film, and therefore can more freely take up and release water vapor and more importantly freely adsorb organic contaminates and acid gases that are harmful to the drive.

Generally the first adsorbent 104 will have a greater capacity to hold water than the second adsorbent 114. Also, the two adsorbents can be made of different materials. For example, the first adsorbent 104 can be primarily or completely silica gel, while the second adsorbent can be primarily or completely activated carbon. FIG. 10A also shows how a filter material 118 covers the top of plastic housing 101. The filter material 118 can be, for example, expanded polytetrafluoroethylene film. The filter material 118 helps prevent the release of particulate contaminants from the inside of the housing 101. For example, silica gel particles or activated carbon particles, which can be released from the adsorbents 104, 114. The filter material 118 can be selected from various filter materials and includes, for example, expanded polytetrafluoroethylene (PTFE).

In addition to the breather opening 130, the filter construction 120 of FIG. 10B shows a first adsorbent 124 positioned within a recess within a plastic housing 121, a substantially water impermeable film 122 on top of the adsorbent 124 (but with an opening 128 in the film 122), and a second adsorbent material 134 located within the housing 121. Both the first adsorbent 124 and the second adsorbent 134 are located inside plastic housing 121. Flow of water vapor to and from the first adsorbent 124 is limited by the polymeric film 122, through which opening 128 has been made. The polymeric film 122 does not surround the first adsorbent 124, but still regulates the movement of moisture into and out of the adsorbent because all other sides of the first adsorbent 124 are covered surrounded by the plastic housing 121. Generally the polymeric film 122 is attached along its edges 125 to the plastic housing 121. However, in some implementations the polymeric film is merely set in place on top of the first adsorbent. The second adsorbent 134 is not surrounded by a polymeric film, and therefore can more freely take up and release water vapor and freely adsorb organic contaminates and acid gases that are harmful to the drive. Generally the first adsorbent 124 will have a greater capacity to hold water than the second adsorbent 134. The two adsorbents can be made of different materials, similar to the embodiments described above in FIGS. 9A and 9B. For example, the first adsorbent can be primarily or completely silica gel, while the second adsorbent can be primarily or completely activated carbon. FIG. 10B also shows how a filter material 138 covers the top of plastic housing 121. The filter material 138 can be, for example, expanded polytetrafluoroethylene film. The filter material 138 helps prevent the release of particulate contaminants from the inside of the housing 121.

Figure 11A:
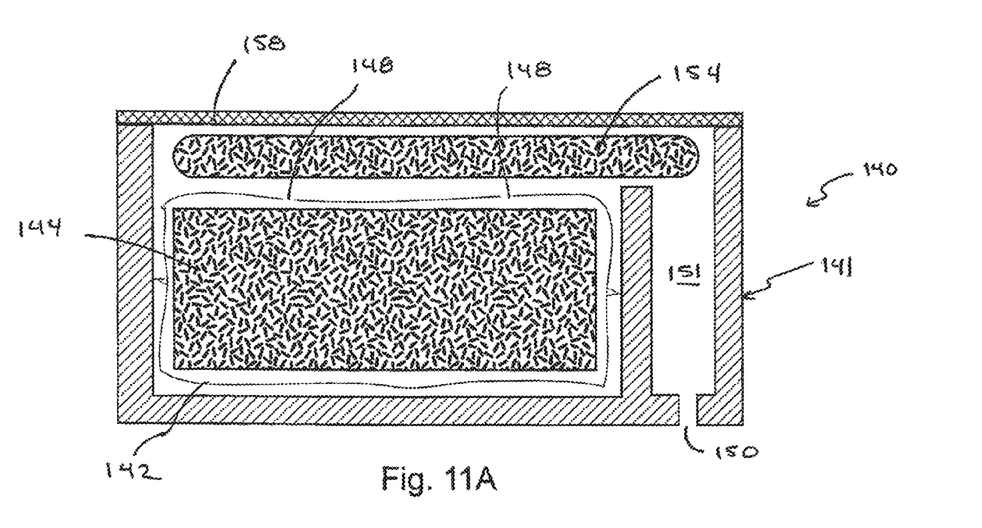
FIG. 11A shows a side cross sectional view of an adsorbent construction made in accordance with an implementation of the invention, the adsorbent construction including a polymeric film covering an adsorbent tablet, and a second adsorbent material located outside of the polymeric film. A breather opening in the housing allows air exchange outside of an electronic enclosure to substantially bypass the first adsorbent.

FIG. 11A shows a side cross sectional view of an adsorbent construction 140 made in accordance with an implementation of the invention, the adsorbent construction 140 including a polymeric film 142 surrounding a first adsorbent material 144, and a second adsorbent material 154 located outside of the polymeric film 142. The adsorbents are positioned within housing 141. A breather opening 150 in the housing allows air exchange outside of an electronic enclosure and to substantially bypass the first adsorbent 144 by way of channel 151. The polymeric film 142 includes one or more openings 148. In addition, a filter material 158 is attached to the housing 141.

Figure 11B:
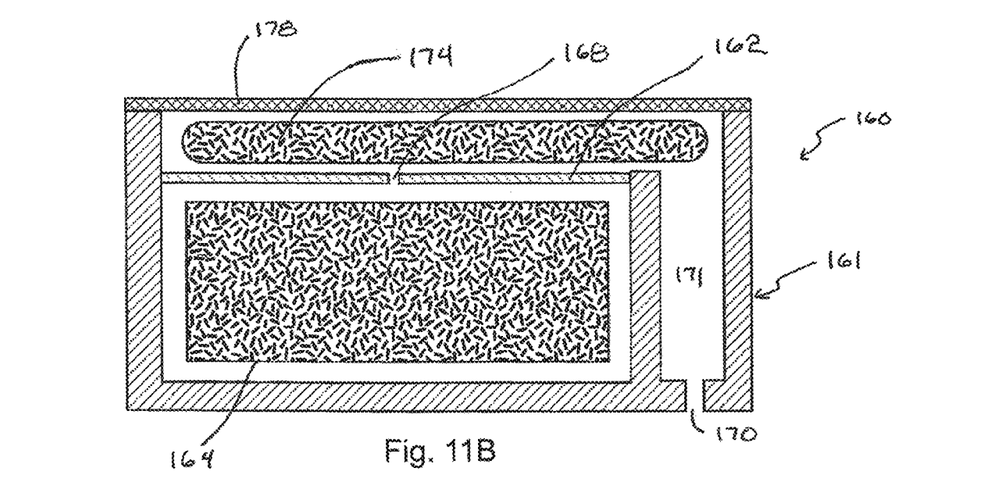
FIG. 11B shows a side cross sectional view of an adsorbent construction made in accordance with an implementation of the invention, the adsorbent construction including an adsorbent tablet positioned within a recess, a substantially water impermeable film covering the adsorbent tablet (but with an opening in the film), and a second adsorbent material located within the housing. A breather opening in the housing allows air exchange from outside of an electronic enclosure to substantially bypass the first adsorbent.

FIG. 11B shows a side cross sectional view of an adsorbent construction 160 made in accordance with an implementation of the invention, the adsorbent construction including an adsorbent material 164 positioned within recess, a substantially water impermeable film 162 covering the adsorbent material 164 (but with an opening 168 in the film 162), and a second adsorbent material 174 located within the housing. A breather opening 170 in the housing to allow air exchange outside of an electronic enclosure and to substantially bypass the adsorbent material 164 while still flowing through second adsorbent 174 and filter material 178. In example embodiments where the breather opening 170 connects to the outside of a disk drive enclosure, the configuration of the breather opening 170 and channel 151 provides for flow of air into the second adsorbent 174.

Figure 12:
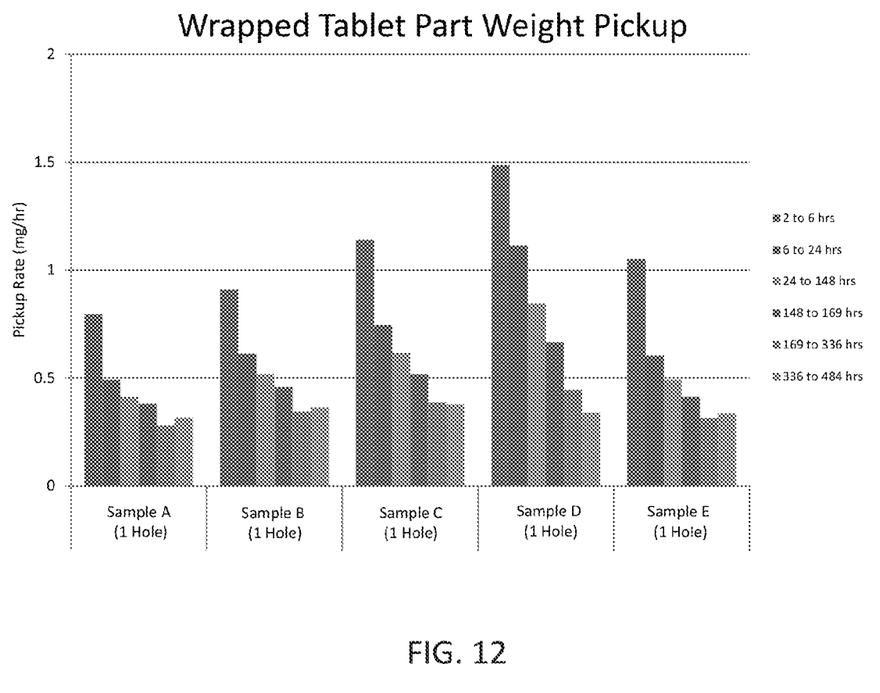
FIG. 12 shows a graph of moisture pickup for sample adsorbent tablets having a 1.6 mils thick polymeric cover with a 0.5 to 1.0 millimeter diameter hole.
Figure 13:
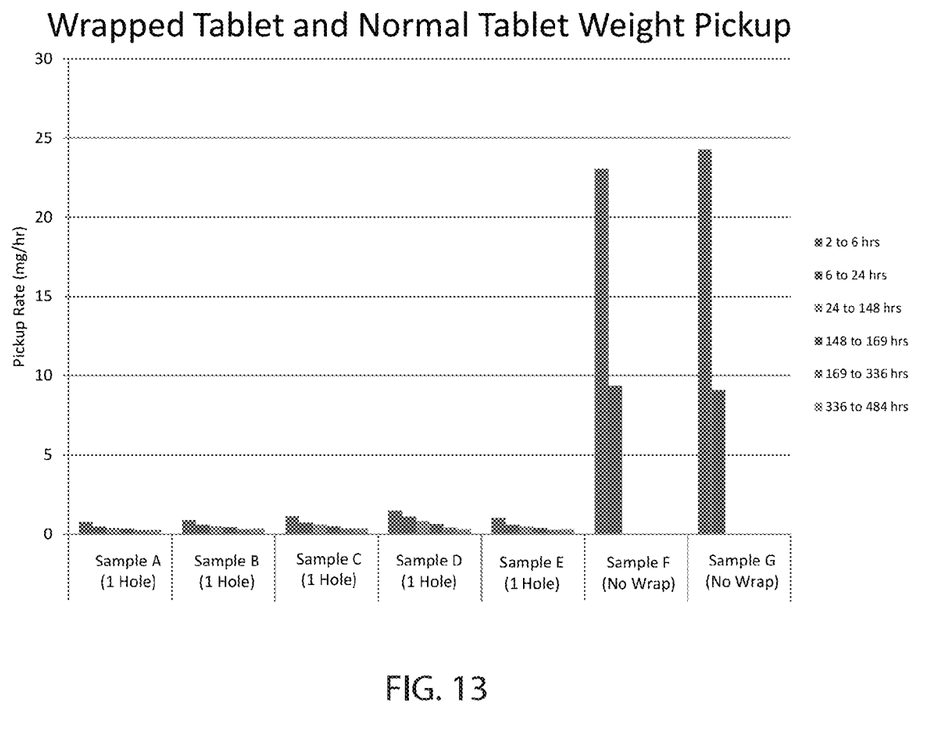
FIG. 13 shows a graph of moisture pickup for sample adsorbent tablets having a 1.6 mils thick polymeric cover with a 0.5 to 1.0 millimeter diameter hole, as well as adsorbent tablets without a polymeric cover.

Now, in reference to FIG. 12 and FIG. 13, performance of example adsorbent constructions made in accordance with the present disclosure are shown. Each filter construction comprised a tablet containing silica gel. The tablets each contained approximately 1.3 grams of silica gel on a dry weight basis. Five of the tablets were enclosed within a polyethylene film that was approximately 1.6 mils thick. The polyethylene film on each tablet was perforated by single hole approximately 0.75 millimeters in diameter. The remaining two tablets were not wrapped in a film.

The tablets were placed in a drying oven at 60 degrees Celsius for 42 hours under partial vacuum to remove excess moisture. The adsorbent constructions each weighed approximately 2.65 grams dry weight after being subjected to the heated vacuum oven. Following drying the tablets were placed in a humidity chamber at 25 degrees Celsius with a relative humidity of 60 percent. The weight change in each tablet was measured periodically. The data for the first 2 hrs is higher as the second adsorbent, that is not wrapped, will pick up water quickly until its water capacity is exhausted.

Table 1 below shows the cumulative moisture pickup of each of the samples while kept in the 25 degrees Celsius chamber at a relative humidity of 60 percent:

TABLE 1

| | CUMULATIVE MOISTURE PICKUP (mg) | | | | | | |
|---|---|---|---|---|---|---|---|
| Time (hrs) | Sample A (film w/ 40 micron hole) | Sample B (film w/ 40 micron hole) | Sample C (film w/ 40 micron hole) | Sample D (film w/ 40 micron hole) | Sample E (film w/ 40 micron hole) | Sample F (No film wrap) | Sample G (No film wrap) |
| 0.5 | 12.72 | 12.87 | 13.82 | 15.43 | 13.64 | 26.98 | 31.55 |
| 1.0 | 16.27 | 15.89 | 16.62 | 17.96 | 16.13 | 37.29 | 43.34 |
| 1.5 | 17.7 | 17.62 | 18.33 | 19.92 | 18.13 | 51.03 | 57.16 |
| 2.0 | 18.95 | 18.7 | 19.71 | 21.26 | 19.22 | 63.43 | 69.81 |
| 2.5 | 19.57 | 19.39 | 20.52 | 22.3 | 20.29 | 80.26 | 87.9 |
| 3.0 | 20.19 | 19.94 | 21.27 | 22.96 | 20.68 | 88.66 | 96.7 |
| 3.5 | 20.49 | 20.5 | 21.77 | 23.64 | 21.37 | 102.78 | 112.21 |
| 4.0 | 20.83 | 20.85 | 22.38 | 24.75 | 21.89 | 119.58 | 129.14 |
| 4.5 | 21.21 | 21.14 | 22.91 | 25.31 | 22.21 | 126.24 | 136.09 |
| 5.0 | 21.54 | 21.66 | 23.34 | 25.95 | 22.61 | 136.31 | 146.3 |

TABLE 1-continued

| | CUMULATIVE MOISTURE PICKUP (mg) | | | | | | |
|---|---|---|---|---|---|---|---|
| Time (hrs) | Sample A (film w/ 40 micron hole) | Sample B (film w/ 40 micron hole) | Sample C (film w/ 40 micron hole) | Sample D (film w/ 40 micron hole) | Sample E (film w/ 40 micron hole) | Sample F (No film wrap) | Sample G (No film wrap) |
| 5.5 | 21.89 | 21.91 | 23.85 | 26.6 | 22.97 | 146.45 | 156.96 |
| 6.0 | 22.13 | 22.34 | 24.27 | 27.21 | 23.43 | 155.57 | 166.92 |
| 24.0 | 30.99 | 33.37 | 37.71 | 47.27 | 34.32 | 324.54 | 331.18 |
| 28.5 | 32.89 | 35.91 | 40.6 | 51.48 | 36.61 | 334.56 | 338.07 |
| 148 | 82.07 | 97.72 | 114.25 | 151.96 | 95.33 | 348.82 | 345.78 |
| 150 | 83.29 | 99.22 | 115.86 | 153.75 | 96.42 | 349.08 | 345.9 |
| 169 | 90.11 | 107.35 | 125.12 | 165.93 | 104 | 349.58 | 346.28 |
| 336 | 136.83 | 164.92 | 189.98 | 240.33 | 156.58 | 349.35 | 346.07 |
| 484 | 189.04 | 224.74 | 252.06 | 295.76 | 212.27 | 348.21 | 344.6 |

FIG. 12 shows a graph of the pickup of moisture of the wrapped tablets. As can be seen from FIG. 12, as well as from Table 1, the wrapped tablets demonstrated continued pickup of moisture even during the final measured period from 336 to 484 hours. The pickup of moisture was highest during the initial period in the humidity chamber, and then gradually declined over each of the subsequent measured periods. Even during the 336 to 484 hour segment the tablets were still pickup up approximately 0.3 milligrams of moisture per hour.

FIG. 13 shows the same results from FIG. 12, but with the addition of the pickup rate from the two unwrapped adsorbent tablets. The unwrapped tablets picked up very high levels of moisture during the period from 2 to 6 hours: over 22.5 milligrams per hour, and close to 25 milligrams per hour. This compares to the wrapped tablets which each had less than 1.5 milligrams per hour, and were generally closer to 1 milligram per hour (see, e.g., Table 1 and FIG. 12) (see, e.g., Table 1 and FIG. 12). In the second displayed period, from 6 to 24 hours, the unwrapped adsorbent tablets continued to show significant pickup of moisture, nearly 10 milligrams per hour on average during this time. In contrast, the wrapped tablets were all less than 1 milligram per hour. By the third displayed period, 24 to 148 hours, the pickup for the unwrapped adsorbent tablets had plummeted to the order of approximately 0.2 milligrams per hour, approximately half of that observed from the wrapped tablets because the adsorbent capacity was exhausted. In subsequent periods the unwrapped tablets picked up no additional water, while the wrapped tablets continued a constant, gradual pickup.

Thus, as shown from FIGS. 12 and 13, the adsorption of moisture by the wrapped adsorbent tablets demonstrated a longer, far more consistent period for pickup of moisture, plus a much lower initial pickup rate. In this regard, the wrapped adsorbent with an approximately 0.75 mm diameter hole showed a more consistent pickup of moisture, would be expected to have a more gradual release of moisture upon heating or placement in a low relative humidity enclosure, and will in this manner contribute to a more stable interior humidity for an electronic enclosure in which it is placed.

While the invention has been particularly shown and described as referenced to the embodiments thereof, those skilled in the art will understand that the foregoing and other changes in form and detail may be made therein without departing from the spirit and scope of the invention.

We claim:

1. An adsorbent construction for use in an electronic enclosure, the adsorbent construction comprising:
   a) a plastic housing defining a cavity;
   b) a first adsorbent material disposed within the cavity;
   c) a substantially water-impermeable film coupled to the housing and covering the cavity, wherein the film defines an opening configured to allow fluid communication between the cavity and the interior of the electronic enclosure; and
   d) a second adsorbent material, wherein the film is disposed between the first adsorbent material and the second adsorbent material, and wherein the substantially water-impermeable film regulates the flow of water vapor into and out of the first adsorbent material.

2. The adsorbent construction of claim 1, wherein the first adsorbent material comprises silica gel.

3. The adsorbent construction of claim 1, wherein the first adsorbent material comprises silica gel, molecular sieve, activated carbon, or combinations thereof.

4. The adsorbent construction of claim 1, wherein the first adsorbent material comprises a compression molded tablet.

5. The adsorbent construction of claim 1, wherein the first adsorbent material comprises at least 10 percent silica gel and at least 10 percent activated carbon.

6. The adsorbent construction of claim 1, wherein the film comprises a metal coating.

7. The adsorbent construction of claim 1, further comprising a filter material coupled to the plastic housing, wherein the film is disposed between the filter material and the housing.

8. The adsorbent construction of claim 1, wherein the opening is less than 2.0 mm wide.

9. The adsorbent construction of claim 1, wherein the second adsorbent has a water adsorption capacity of less than 5% grams per gram of adsorbent below 60% relative humidity.

10. An adsorbent construction for use in an electronic enclosure, the adsorbent construction comprising:
    a) a first adsorbent material;
    b) a housing defining an internal volume and comprising a substantially water-impermeable polymeric material, wherein the first adsorbent material is disposed within the internal volume;
    c) an opening defined by the polymeric material;
    d) a filter material in fluid communication with the opening; and
    e) a second adsorbent material, wherein the polymeric material is disposed between the first adsorbent material and the second adsorbent material.

11. The adsorbent construction of claim 10, wherein the first adsorbent material comprises silica gel.

12. The adsorbent construction of claim 10, wherein the first adsorbent material comprises from 10 to 90 percent silica gel.

13. An adsorbent construction for use in an electronic enclosure, the adsorbent construction comprising:
   a) a substantially rigid body defining an internal volume and at least a first opening;
   b) a first adsorbent material positioned within the internal volume of the substantially rigid body, the adsorbent material substantially surrounded by a polymeric cover; and
   c) a second adsorbent material positioned within the substantially rigid body, the second adsorbent material positioned outside of the polymeric cover.

14. The adsorbent construction of claim 13, wherein the polymeric cover has a moisture vapor transmission rate of less than 25 grams per square meter per 24 hours per 1 mil thickness at 38 degrees C. and 90 percent relative humidity.

15. The adsorbent construction of claim 13, wherein the adsorbent material comprises silica gel, molecular sieve, activated carbon, or combinations thereof.

* * * * *